W. H. HUTCHINS.
Potato-Digger.
No 71,177. Patented Nov. 19, 1867.
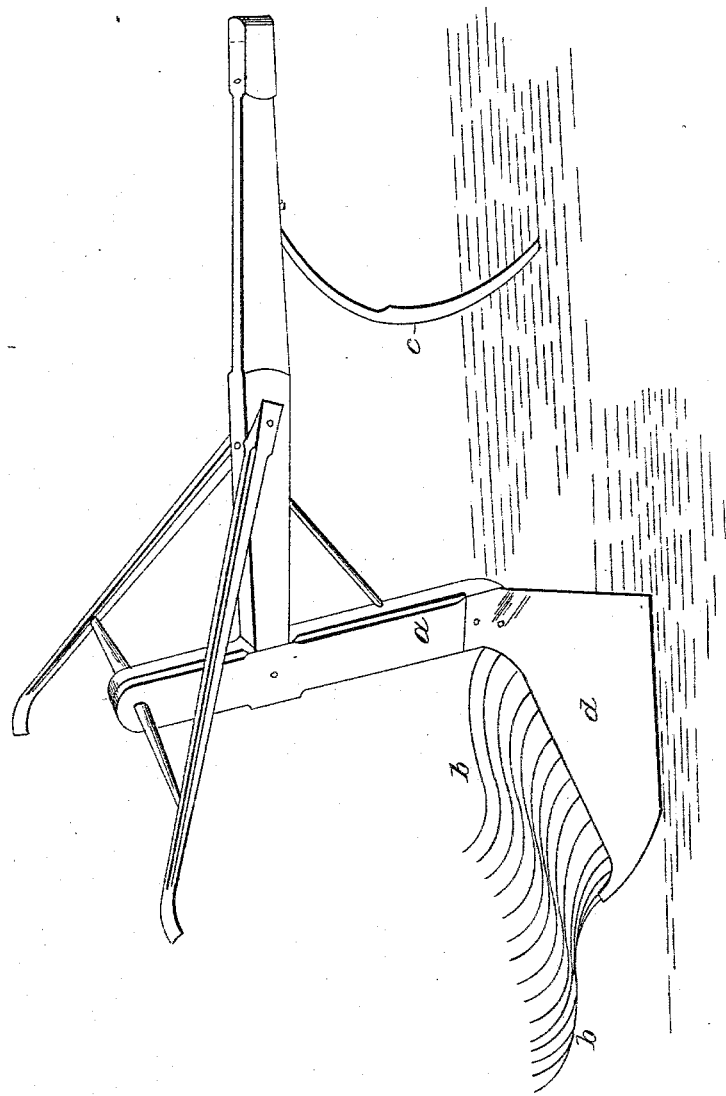
Witnesses:
Thos A Hutchins
T. R. Bailey
Inventor:
Wm H Hutchins

United States Patent Office.

WILLIAM H. HUTCHINS, OF LOCKPORT, ILLINOIS.

Letters Patent No. 71,177, dated November 19, 1867.

IMPROVEMENT IN POTATO-DIGGER.

*The Schedule referred to in these Letters Patent and making part of the same.*

Be it known that I, WILLIAM H. HUTCHINS, of the town of Lockport, in Will county, and State of Illinois, have invented a new and useful Improvement on a Potato-Digger; and I do hereby declare that the following is a full and exact description thereof, reference being had to the accompanying drawings, and to the letters of reference marked thereon, which said drawings make a part of this specification.

The nature of my invention consists in arranging a set of hooked prongs to the rear part of the mould-board or share of any plough, but generally to one in shape like that of a shovel-plough, in such a manner as not only to sift the dirt out from the potatoes as the hill is ploughed up, but to also act as a harrow from beneath, harrowing the hill from the bottom, pulverizing the earth, and separating the potatoes therefrom.

In the construction of a machine, I set the share or blade of the plough at one side of the shin $a$, as shown in the drawings, for the purpose of allowing the horse to walk between the rows. To the rear edge or back of the share or blade I attach the prongs $b\ b$, of the peculiar shape shown in the drawings hereto annexed, placed at a sufficient distance from each other to allow the earth to sift through between them.

I am aware that prongs or arms have been used before, but never, as I believe, of the shape or in the particular manner here used, this performing as well the office of a harrow from beneath as rack to sift out the earth. In order that the potato-tops and weeds may not catch on the outer ends of the prongs, they are inclined a little back. The most particular object is to harrow up under the bottom of the hill.

The operator, to better facilitate the separation of the earth from the potatoes, shakes the plough around as it passes along, which sifts the earth through between the prongs, and scatters the potatoes on the surface.

The hooked knife $c$ is for the purpose of pulling the vines and weeds around out of the way of the shin of the plough, or cuts them off; at the same time has a tendency to hold the plough more steady than it would otherwise run.

What I claim as new in my invention, and desire to secure by Letters Patent, is—

The combination of the concave share or blade $d$, and the prongs $b\ b$, rigidly fixed thereto, and of the peculiar and particular shape shown, all constructed and arranged as and for the purposes set forth.

WILLIAM H. HUTCHINS.

Witnesses:
 THOS. H. HUTCHINS,
 F. B. COCHRANE.